United States Patent Office

3,531,324
Patented Sept. 29, 1970

3,531,324
SECONDARY POWER-PRODUCING CELL
Albert K. Fischer, Western Springs, Victor A. Maroni, Riverside, Arthur D. Tevebaugh, Hinsdale, and Elton J. Cairns, Downers Grove, Ill., assignors to the United States of America as represented by the United States Atomic Energy Commission
Filed July 15, 1969, Ser. No. 841,828
Int. Cl. H01m 35/00
U.S. Cl. 136—20                                7 Claims

ABSTRACT OF THE DISCLOSURE

A secondary power-producing cell includes a molten metal anode consisting of a metal of low electronegativity such as lithium, a molten fused salt electrolyte, and a cathode consisting of a molten mixture of phosphorus and sulfur having a composition between that of $P_4S_3$ and $P_4S_{10}$.

CONTRACTUAL ORIGIN OF THE INVENTION

The invention described herein was made in the course of, or under, a contract with the United States Atomic Energy Commission.

BACKGROUND OF THE INVENTION

This invention relates to an electrochemical power-producing cell and more particularly to such a cell having molten metal electrodes and including a fused salt electrolyte. In more detail, the invention relates to a new cathode material for an electrochemical power-producing cell including a known molten-metal anode, and a known fused salt electrolyte.

In our technologically oriented society, there is an increasing need for compact, convenient, pollution-free electrical power sources and energy-storage devices. A large number of power-source needs, both civilian and military, have gone unfulfilled because of the limited capabilities of presently available batteries and engine-generators. In an attempt to satisfy these needs, a great deal of effort has been expended over the last decade in the areas of energy conversion and energy storage. A large portion of the effort has involved electrochemical devices such as fuel cells, metal/air cells, secondary (electrically rechargeable) cells with both aqueous and nonaqueous electrolytes and thermaly regenerative cells.

Although a wide variety of electrochemical cells is available, none of these can deliver enough power per unit weight (specific power, w./kg.) and store enough energy per unit weight (specific energy, w-hr./kg.) to make them useful in such demanding applications as long-lived spacecraft power supplies, certain military communications uses, vehicle propulsion, and off-peak energy storage for central stations. Thus there is a continuing search for new electrochemical cell configurations that have the potential of storing a large amount of energy per unit weight and also delivering a large amount of power per unit weight. For example, a substantial amount of work has been done on cells consisting of a molten alkali metal anode such as lithium, a fused salt electrolyte such as the eutectic of lithium fluoride, lithium chloride and lithium iodide and a molten electronegative cathode such as selenium, tellurium or sulfur. While such cells have great promise, it cannot be certain at this stage of their development that commercially practical batteries of this type are possible. Accordingly, a search for other configurations must continue.

SUMMARY OF THE INVENTION

We have found that cells of this same general type incorporating both phosphorus and sulfur in the liquid state as cathode material have certain advantages. In such a cell both the phosphorus and the sulfur appear to inhibit the formation of high molecular weight aggregates of the other. At the temperatures of greatest interest both phosphorus and sulfur polymerize—sulfur becoming viscous and white phosphorus polymerizing to red phosphorus which has a high melting point. Thus neither sulfur by itself nor phosphorus by itself is completely satisfactory. We have found that mixtures of phosphorus and sulfur in atomic weight proportions between that of $P_4S_{10}$ and $P_4S_3$—both known compounds—may be used in accordance with this invention. Mixtures of phosphorus and sulfur, in addition, have a lower equivalent weight than has tellurium or selenium and cells incorporating these mixtures have a lower operating temperature than cells incorporating tellurium.

It is contemplated that mixtures of phosphorus and sulfur such as those which contain a proportion of phosphorus to sulfur between that of $P_4S_3$ and $P_4S_{10}$ would also be operative as cathode material and also would have the same advantages as $P_4S_3$ and $P_4S_{10}$. Cells which have been tested satisfactorily include Li/LiF-LiCl-LiI/Li in $P_4S_{10}$
Li/LiCl-KCl/Li in $P_4S_{10}$
Li/LiBr-RbBr/Li in $P_4S_{10}$
Li/LiBr-RbBr/Li in $P_4S_3$

DESCRIPTION OF THE PREFERRED EMBODIMENT

Figure 1:
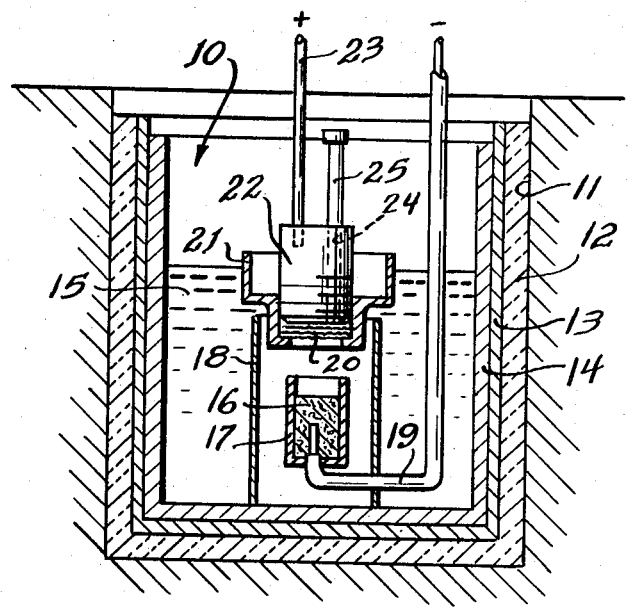
FIG. 1 is a schematic view of a cell used experimentally to prove operability of the present invention.

Referring now to FIG. 1, cell 10 is disposed within furnace well 11. Furnace well 11 contains, in order, a cup-shaped alumina insulator 12, a stainless steel cup 13, and an alumina cup 14 filled with a fused salt electrolyte 15. The anode consists of a stainless steel sponge 16—soaked in lithium—disposed in a boron nitride or thoria cup 17 submerged in electrolyte 15. Alumina sleeve 18 surrounds cup 17 to immobilize the anode and reduce the probability of surface shorts caused by the spreading of liquid lithium. An insulated tantalum wire 19 which passes through the bottom of cup 17 serves as anode lead.

The cathode current collector consists of a plurality of fine-mesh niobium expanded-metal disks 20—soaked in $P_4S_{10}$ as cathode— which are disposed in the bottom of a niobium cup 21. Niobium cup 21 includes a portion of diameter smaller than the diameter of sleeve 18 which fits into the top of the sleeve. The bottom of cup 21 has internal screw threads therein into which is screwed a niobium contact 22 to which is attached a cathode lead 23. Contact 22 is screwed tightly against niobium screens 20 to ensure good electrical contact. Contact 22 contains a vertical hole 24 provided with a plug 25 by which entrapped gases may be released so that electrolyte 15 will rise in cup 21 to make contact with niobium screens 20.

Figure 2:
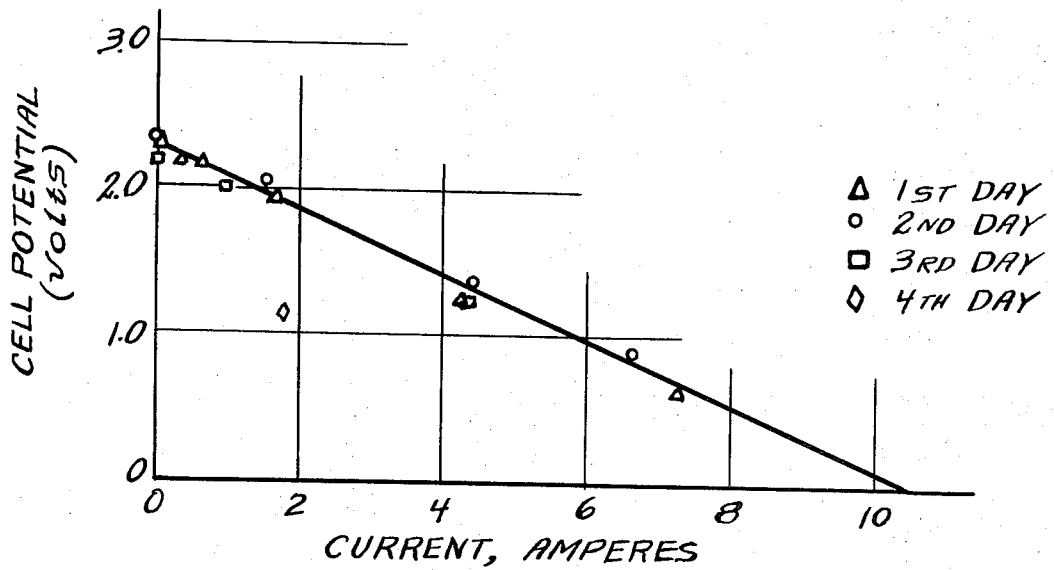
FIG. 2 is a graph giving current-voltage data for a Li/LiF-LiCl-LiI/Li in $P_4S_{10}$ cell incorporating a tungsten sponge cathode current collector.
Figure 7:
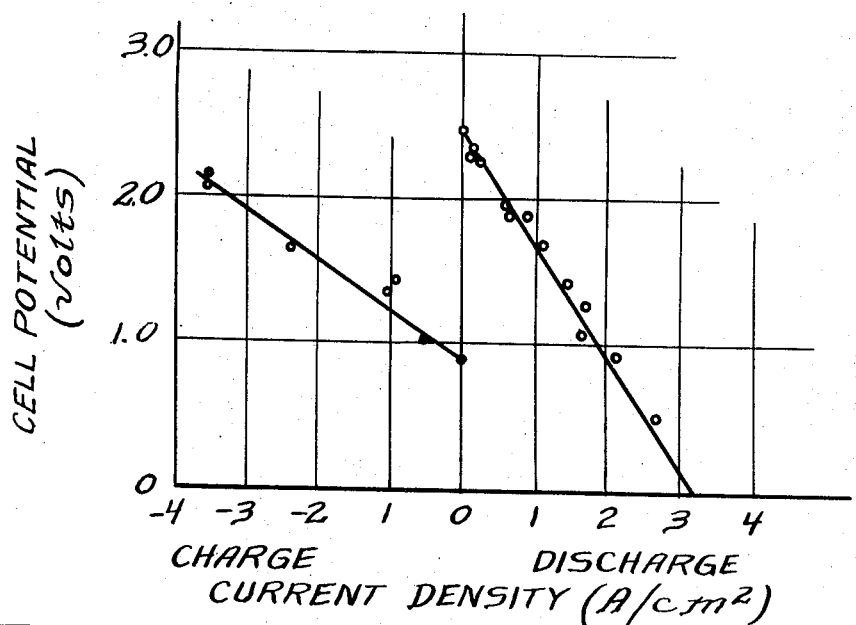
FIG. 7 is a graph giving voltage-current density data for a Li/LiBr-RbBr/Li in $P_4S_3$ cell incorporating a stack of niobium expanded metal disks as cathode current collector.

Similar cell structures to that described have been employed to test several cell configurations. A series of Li/LiF-LiCl-LiI/Li in $P_4S_{10}$ cells have been operated at 400° C. using several different materials as cathode current collector. The cells were operated for up to seven days and gave open-circuit voltages in the range 2.30–2.60 volts. In cells using plain stainless steel, 304 and 316 stainless steels and Carpenter-20 stainless steel current collector, there was considerable corrosion. A cell constructed with a cathode current collector made from Hastelloy-N (7 wt. percent CR-16 wt. percent Mo-5 wt. percent Fe-72 wt. percent Ni) showed considerably less corrosion. One cell, that had a cathode current collector constructed from a cylindrical tungsten sponge (1.25 cm. dia. x 1.25 cm. long), gave considerably better day-to-day performance at 400° C. than any of the previously mentioned cells. Current-voltage data for this cell are given in FIG. 2. The cell operated consistently for three days, but on the fourth day the internal resistance increased considerably. The tungsten sponge did not appear to be corroded, but numerous large cracks were apparent. These probably resulted from expansion of the solid cathode products formed during discharge.

Figure 3:
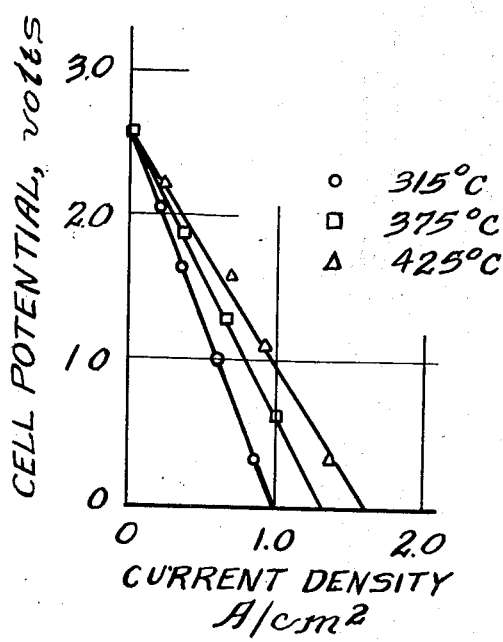
FIG. 3 is a graph giving voltage-current density data for the same cell incorporating a tantalum sponge current collector.

A cell constructed with a tantalum sponge cathode current collector (41% porosity, 15$\mu$ pore size) was operated for five days at 400° C. The anode area was greater than 1.00 cm.$^2$, the cathode area was 0.814 cm.$^2$, the interelectrode distance was ~2.0 cm., and the theoretical capacity density was 0.25 ampere-hour/cm.$^2$. The day-to-day current density-voltage curves for this cell are given in FIG. 3. The open-circuit voltage at the fully charged state was 2.60 v. and the maximum short circuit current density obtained was 4.58 a./cm.$^2$.

A cell with a cast molybdenum wire cathode current collector supported in a pressed and sintered molybdenum cup was operated for 24 hours. While the pressed and sintered cup was badly corroded, the cast molybdenum wire cathode current collector did not appear to have been attacked.

Figure 4:
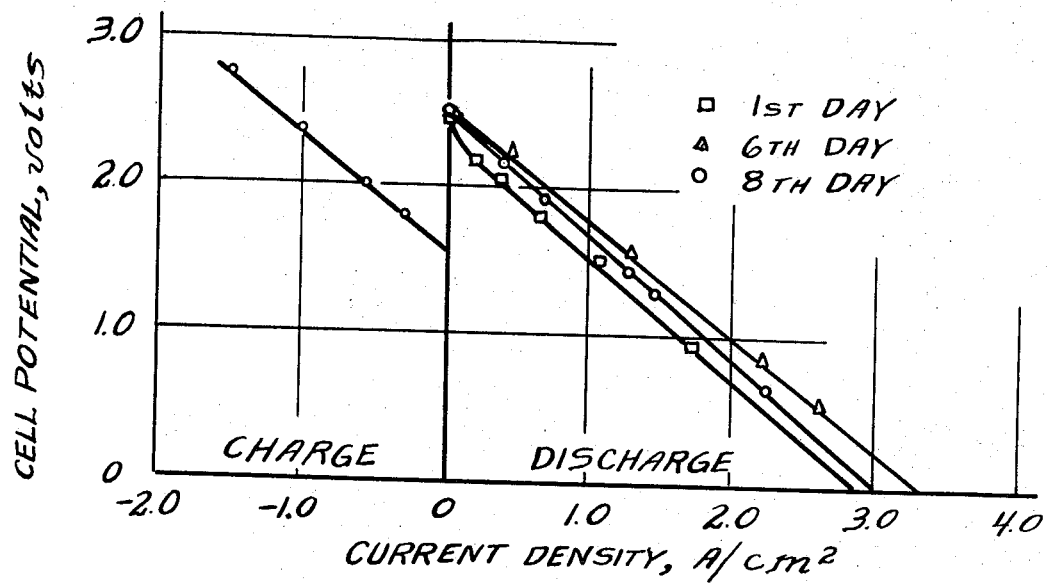
FIG. 4 is a graph giving voltage-current density data for a Li/LiCl-KCl/Li in $P_4S_{10}$ cell incorporating a niobium sponge cathode current collector.

A Li/LiCl-KCl/Li in $P_4S_{10}$ cell has been operated at 400° C. for seven days. The cathode current collector was a niobium sponge (37.5% porosity, 7$\mu$ pore size) supported by a tantalum rod. Anode area was about 2.0 cm.$^2$, cathode area equalled 1.77 cm.$^2$, and the interelectrode distance was about 2.0 cm. The anode current collector consisted of a stainless steel sponge supported by a thoria insulator to reduce the probability of surface shorts caused by spreading of liquid lithium. Periodic current-voltage data for this cell are given in FIG. 4. An open-circuit voltage of 2.45 v. obtained by extrapolation of voltage-current density curves to zero current density was maintained for the duration of the test and the short-circuit current densities ranged from 2.85 to 3.30 a./cm.$^2$. After seven days there was no apparent corrosion of either the niobium sponge or the tantalum supporting rod, and the thoria and alumina insulators used in the cell construction were intact.

Figure 5:
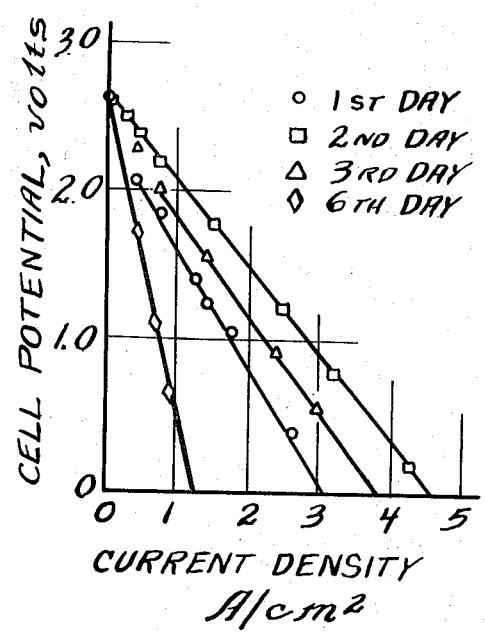
FIG. 5 is a graph giving voltage-current density data for a Li/LiBr-RbBr/Li in $P_4S_{10}$ cell incorporating a tantalum sponge cathode current collector.

A Li/LiBr-RbBr/Li in $P_4S_{10}$ cell has been operated in the temperature range 315 to 425° C. The cathode current collector consisted of a tantalum sponge with 52% porosity but unknown pore size, 1.77 cm.$^2$ in area. The anode area was about 2.0 cm.$^2$ and the interelectrode distance was about 2.0 cm. Voltage-current density data obtained at 315, 375 and 425° C. are plotted in FIG. 5. The total theoretical capacity of this cell could not be determined, but the usable capacity was measured at 355° C. for three different discharge rates, starting from the same open-circuit voltage. These data, given in Table I, indicate that the usable capacity decreases sharply as the discharge rate is increased.

TABLE I.—CAPACITY-CURRENT DENSITY DATA FOR A LITHIUM/$P_4S^{10}$ CELL

| | | | |
|---|---|---|---|
| Discharge rate (A./cm.$^2$) | 0.17 | 0.32 | 0.97 |
| Usable capacity (A. hr./cm.$^2$) | 0.074 | 0.055 | 0.010 |

Figure 6:
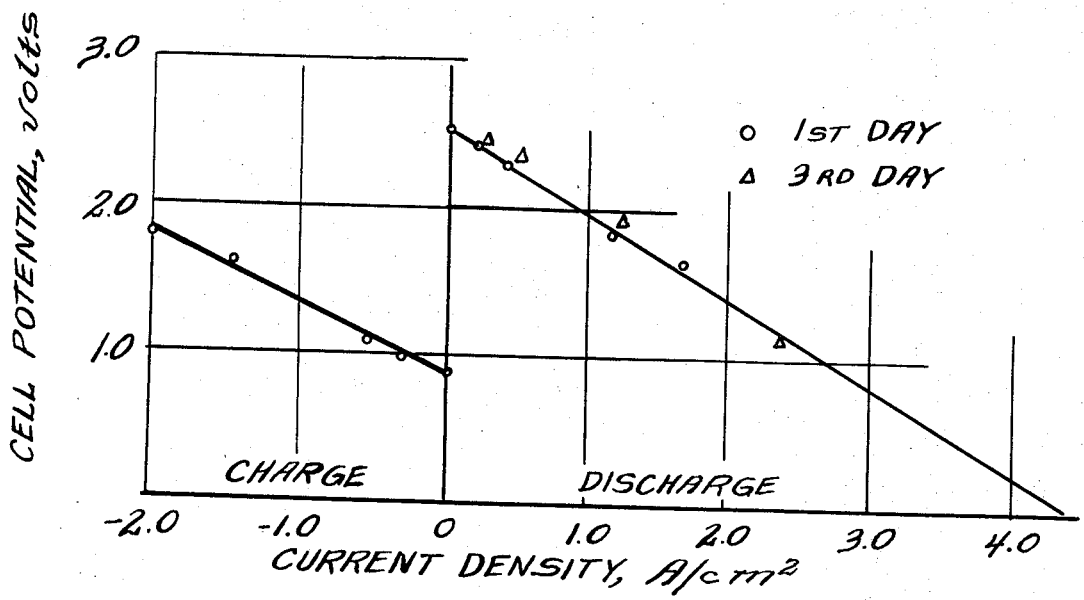
FIG. 6 is a graph giving voltage-current density data for a Li/LiBr-RbBr/Li in $P_4S_{10}$ cell incorporating a stack of niobium expanded metal disks as cathode current collector.

The equipment shown in FIG. 1 of the drawing was used for the tests reported next. A Li/LiBr-RbBr/Li in $P_4S_{10}$ cell has been operated at 400° C. for three days. The cathode current collector consists of a stack of fine niobium expanded metal mesh disks, each being .0224 cm. thick and 1.5 cm. in diameter. The corresponding porosity and pore size were 72% and 0.079 cm., respectively. The anode area was 0.71 cm.$^2$, the cathode area 0.71 cm.$^2$, and the interelectrode distance 1.0 cm. The voltage-current density characteristics are shown in FIG. 6. An open-circuit voltage of 2.56 v. was used for all electrical measurements, and a short-circuit current density data taken during the three days of operation. The usable capacity of this cell decreased monotonically with increasing discharge rate, as shown in Table II.

TABLE II.—CAPACITY-CURRENT DENSITY DATA FOR A LITHIUM/$P_4S^{10}$ CELL

| | | | | | |
|---|---|---|---|---|---|
| Discharge rate (Ampere/cm.$^2$) | 0.15 | 0.28 | 0.61 | 1.15 | 3.20 |
| Percent of theoretical capacity obtained | 20 | 15 | 10 | 4.4 | 1.6 |

It should be noted that the reaction products of the reaction between lithium and $P_4S_{10}$ occurring in the cell have not yet been identified. The percent of theoretical capacity obtained was calculated on the assumption that $Li_2S$ and $Li_3P$ are the reaction products.

There was no evidence for corrosion of the niobium cathode compartment or niobium expanded mesh, but the thoria crucible used to contain the lithium-soaked anode sponge was badly discolored and embrittled.

Using the same equipment as was used in the preceding example, a Li/LiBr-RbBr/Li in $P_4S_3$ cell has been operatted at 400° C. The voltage-current density characteristics are shown in FIG. 6. Capacity-current density data follows.

TABLE III.—CAPACITY-CURRENT DENSITY DATA FOR A LITHIUM/$P_4S^3$ CELL

| | | | | |
|---|---|---|---|---|
| Discharge rate (Amperes/cm.$^2$) | 1.2 | 0.58 | 1.58 | 0.067 |
| Percent of theoretical capacity obtained | 7.7 | 13 | 6.9 | 25 |

In the course of operation of the described cells, the cathode becomes partially solid during operation. The term "liquid state" as employed in the specification and claims is to be interpreted with reference to the physical state of the cathode is to be interpreted to cover this condition.

It will be understood that the invention is not to be limited to the details given herein but that it may be modified within the scope of the appended claims.

The embodiments of the invention in which an exclusive property or privilege is claimed are defined as follows:

1. A secondary power-producing cell including a liquid lithium-metal anode, a fused-salt electrolyte containing ions of the anode metal and a cathode consisting of a mixture of phosphorus and sulfur in the liquid state in atomic weight proportions between that of $P_4S_3$ and $P_4S_{10}$.

2. A cell according to claim 1 wherein the cathode is composed of $P_4S_{10}$.

3. A cell according to claim 1 wherein the cathode is composed of $P_4S_3$.

4. A cell according to claim 2 wherein the fused-salt electrolyte is the eutectic of LiF-LiCl-LiI.

5. A cell according to claim 2 wherein the fused-salt electrolyte is the eutectic of LiCl and KCl.

6. A cell according to claim 2 wherein the fused-salt electrolyte is the eutectic of LiBr and RbBr.

7. A cell according to claim 2 and including a cathode current collector formed of a stack of fine mesh, expanded-metal niobium disks which are soaked in the $P_4S_{10}$.

References Cited

UNITED STATES PATENTS 3,476,602  11/1969  Brown et al. _____ 136—6

WINSTON A. DOUGLAS, Primary Examiner

C. F. LE FEVOUR, Assistant Examiner

U.S. Cl. X.R.

136—6, 86